(12) United States Patent
Liang

(10) Patent No.: US 7,149,879 B2
(45) Date of Patent: Dec. 12, 2006

(54) PROCESSOR AND METHOD OF AUTOMATIC INSTRUCTION MODE SWITCHING BETWEEN N-BIT AND 2N-BIT INSTRUCTIONS BY USING PARITY CHECK

(75) Inventor: Bor-Sung Liang, Kaohsiung (TW)

(73) Assignee: Sunplus Technology Co., Ltd. (TW)

( * ) Notice: Subject to any disclaimer, the term of this patent is extended or adjusted under 35 U.S.C. 154(b) by 402 days.

(21) Appl. No.: 10/682,957

(22) Filed: Oct. 14, 2003

(65) Prior Publication Data

US 2004/0181650 A1  Sep. 16, 2004

(30) Foreign Application Priority Data

Mar. 10, 2003  (TW) ................ 92105116 A

(51) Int. Cl.
*G06F 9/30* (2006.01)

(52) U.S. Cl. ...................... 712/210; 712/208

(58) Field of Classification Search ........... 712/208, 712/210
See application file for complete search history.

(56) References Cited

U.S. PATENT DOCUMENTS

| | | | |
|---|---|---|---|
| 5,511,174 A * | 4/1996 | Hicok et al. ........... 711/201 |
| 5,568,646 A | 10/1996 | Jaggar |
| 5,881,259 A * | 3/1999 | Glass et al. ........... 712/210 |
| 5,881,260 A | 3/1999 | Raje et al. |
| 5,905,893 A | 5/1999 | Worrell |
| 6,014,735 A * | 1/2000 | Chennupaty et al. ..... 712/210 |
| 6,026,486 A | 2/2000 | Kodama et al. |
| 6,189,090 B1 * | 2/2001 | Tan et al. ............. 712/229 |
| 6,209,079 B1 * | 3/2001 | Otani et al. ........... 712/210 |

* cited by examiner

*Primary Examiner*—Fritz Fleming
*Assistant Examiner*—Vincent Lai
(74) *Attorney, Agent, or Firm*—Bacon & Thomas PLLC

(57) ABSTRACT

A processor and method of automatic instruction mode switching between N-bit and 2N-bit instructions by using parity bit check. The processor and method includes an instruction input device having a memory for storing a plurality of 2N-bit words, an instruction fetch device fetching a 2N-bit word from the memory, and a mode switch logic determining whether the 2N-bit word fetched by the instruction fetch device is two (N-P)-bit instructions or one 2(N-P)-bit instruction to accordingly switch the processor to corresponding N-bit or 2N-bit mode, wherein when the 2N-bit word fetched is even parity, the 2N-bit word is determined as two (N-P)-bit instructions if two N-bit words included in the 2N-bit word are on the even parity state, or determined as a 2(N-P)-bit instruction if the two N-bit words are on the odd parity state.

12 Claims, 8 Drawing Sheets

| WP | UHP | LHP | |
|----|-----|-----|---|
| E  | E   | E   | 15bit+15bit |
| E  | O   | O   | 30bit |
| O  | E   | O   | Special State |
| O  | O   | E   | Special State |

FIG. 6

| WP | UHP | LHP | |
|---|---|---|---|
| O | E | O | 15bit+15bit |
| O | O | E | 30bit |
| E | E | E | Special State |
| E | O | O | Special State |

FIG. 9

| WP | UHP | LHP | |
|---|---|---|---|
| O | O | E | 15bit+15bit |
| O | E | O | 30bit |
| E | E | E | Special State |
| E | O | O | Special State |

FIG. 10

PROCESSOR AND METHOD OF AUTOMATIC INSTRUCTION MODE SWITCHING BETWEEN N-BIT AND 2N-BIT INSTRUCTIONS BY USING PARITY CHECK

BACKGROUND OF THE INVENTION

1. Field of the Invention

The present invention relates to a technical field of processor and, more particularly, to a processor and method by using parity check to switch instruction modes in a computer device.

2. Description of Related Art

Typically, a processor is provided with 32-bit/16-bit instruction modes and capable of switching between the two modes to save required memory for storing programming codes. U.S. Pat. No. 5,758,115 granted to Nevill and Edward Colles for an "Interoperability with multiple instruction sets" uses T bit of a program counter (PC) to determine whether the processor is in 32-bit or 16-bit instruction mode and uses a branch instruction to change values of the T bit of the program counter. The instruction modes are switched as shown in FIG. 1. When the branch instruction 220 is performed after the data processing 210 to branch a program flow to a start address Badd(1) that is stored with a 16-bit instruction so as to execute the 16-bit instruction, the T bit is switched by +1 to inform the processor to be in the 16-bit instruction mode for the data processing 230. The branch instruction 240 is performed after the data processing 230 to branch the program flow to address Badd(2) that is stored with a 32-bit instruction to execute the 32-bit instruction for the data processing 250.

As to the aforementioned problem, U.S. Pat. No. 6,209,079B1 granted to Otani, et al. for a "Processor for executing instruction codes of two different lengths and device for inputting the instruction codes" has provided a solution by applying the most significant bit (MSB) of an instruction code to determine whether the processor is in 32-bit or 16-bit instruction mode. As shown in FIG. 2, the 32-bit word contains a 32-bit instruction if the MSB on 32-bit boundary is '1' and two 16-bit instructions if the MSB on 32-bit boundary is '0'. Two 16-bit instructions are performed sequentially if the MSB of 16-bit instruction B is '0'. Two 16-bit instructions are performed in parallel if the MSB of 16-bit instruction B is '1'. Such an instruction mode switch is used in the processors of M32R series. In this case, the 32-bit and 16-bit instructions can be stored in the same block to increase code density. However, when a branch or jump instruction is performed, it needs to be dealt careful to avoid jumping to the last half portion of a 32-bit instruction. Because the last half portion of a 32-bit instruction is not executable, it may cause unpredictable error. Therefore, the jump address requires to be limited to a word boundary or 32-bit boundary. The return addresses for branch-and-link and jump-and-link instructions also require to be limited to a word boundary or 32-bit boundary. Such a limitation adds inconvenience in use. In addition, there is no error tolerance designed for the above processor in executing the branch or jump instruction. That is, when the processor produces a wrong jump address due to a hardware problem or external interference, the processor may lead to system halt. Therefore, the conventional 32-bit/16-bit instruction mode switching still encounters many problems, and thus it is desirable to provide an improved processor and method to mitigate and/or obviate the aforementioned problems.

SUMMARY OF THE INVENTION

The object of the present invention is to provide a processor and method by using parity check to switch instruction modes, thereby avoiding complicated problem presented on word boundary or 32-bit boundary caused by the prior jump address limitation, and increasing both code density and system stability to obtain error tolerance.

According to a feature of the present invention, there is provided a processor using parity check to switch instruction modes, which can execute N-bit and 2N-bit mode instructions respectively in N-bit and 2N-bit modes. The N-bit mode instruction consists of an N-bit word and the 2N-bit mode instruction consists of two N-bit words. Each N-bit word includes P-bit parity and (N-P)-bit instruction code, where P is an integer greater than or equal to 1. The parity of each N-bit mode instruction is used to set corresponding N-bit word to a first parity state. The parity of each N-bit word of each 2N-bit mode instruction is used to set corresponding N-bit word to a second parity state. The processor includes an instruction input device, an instruction fetch device and a mode switch logic. The instruction input device includes a memory having a width of 2N-bit for storing a plurality of 2N-bit words representing instructions. The instruction fetch device fetches a 2N-bit word from the instruction input device. The mode switch logic determines whether the 2N-bit word fetched by the instruction fetch device is two (N-P)-bit instructions or one 2(N-P)-bit instruction, and accordingly switches the processor to corresponding N-bit or 2N-bit mode. When the 2N-bit word fetched is even parity, the 2N-bit word is determined as two (N-P)-bit instructions if two N-bit words included in the 2N-bit word are on the first parity state and determined as a 2(N-P)-bit instruction if the two N-bit words are on the second parity state.

According to another feature of the present invention, there is provided a method using parity check to switch instruction modes in a processor, which can execute in N-bit and 2N-bit modes. The processor includes an instruction input device to provide N-bit and 2N-bit mode instructions. The N-bit mode instruction consists of an N-bit word and the 2N-bit mode instruction consists of two N-bit words. Each N-bit word includes P-bit parity and (N-P)-bit instruction code, where P is an integer greater than or equal to 1. The parity of each N-bit mode instruction is used to set corresponding N-bit word to a first parity state. The parity of each N-bit word of each 2N-bit mode instruction is used to set corresponding N-bit word to a second parity state. The method includes: fetching a 2N-bit word representing an instruction; when the 2N-bit word is on an even parity state, determining that the 2N-bit word is two (N-P)-bit instructions if two N-bit words included in the 2N-bit word are both on the first parity state, and accordingly switching the processor to the N-bit mode; and when the 2N-bit word is on an even parity state, determining that the 2N-bit word is one 2(N-P)-bit instruction if two N-bit words included in the 2N-bit word are both on the second parity state, and accordingly switching the processor to the 2N-bit mode for performance.

Other objects, advantages, and novel features of the invention will become more apparent from the following detailed description when taken in conjunction with the accompanying drawings.

BRIEF DESCRIPTION OF THE DRAWINGS

FIG. 6 is a view of a look-up table in accordance with the invention;

FIG. 9 is a view of another look-up table in accordance with the invention; and

FIG. 10 is a view of a further look-up table in accordance with the invention.

DETAILED DESCRIPTION OF THE PREFERRED EMBODIMENT

The inventive processor and method by using parity check to switch instruction modes can execute N-bit and 2N-bit mode instructions respectively in N-bit and 2N-bit modes. The N-bit mode instruction consists of an N-bit word, and the 2N-bit mode instruction consists of two N-bit words. Each N-bit word includes P-bit parity and (N-P)-bit instruction code, where P is an integer greater than or equal to 1. In this embodiment, for illustrative purpose, N is preferred to be 16 and P is preferred to be 1.

Figure 1:
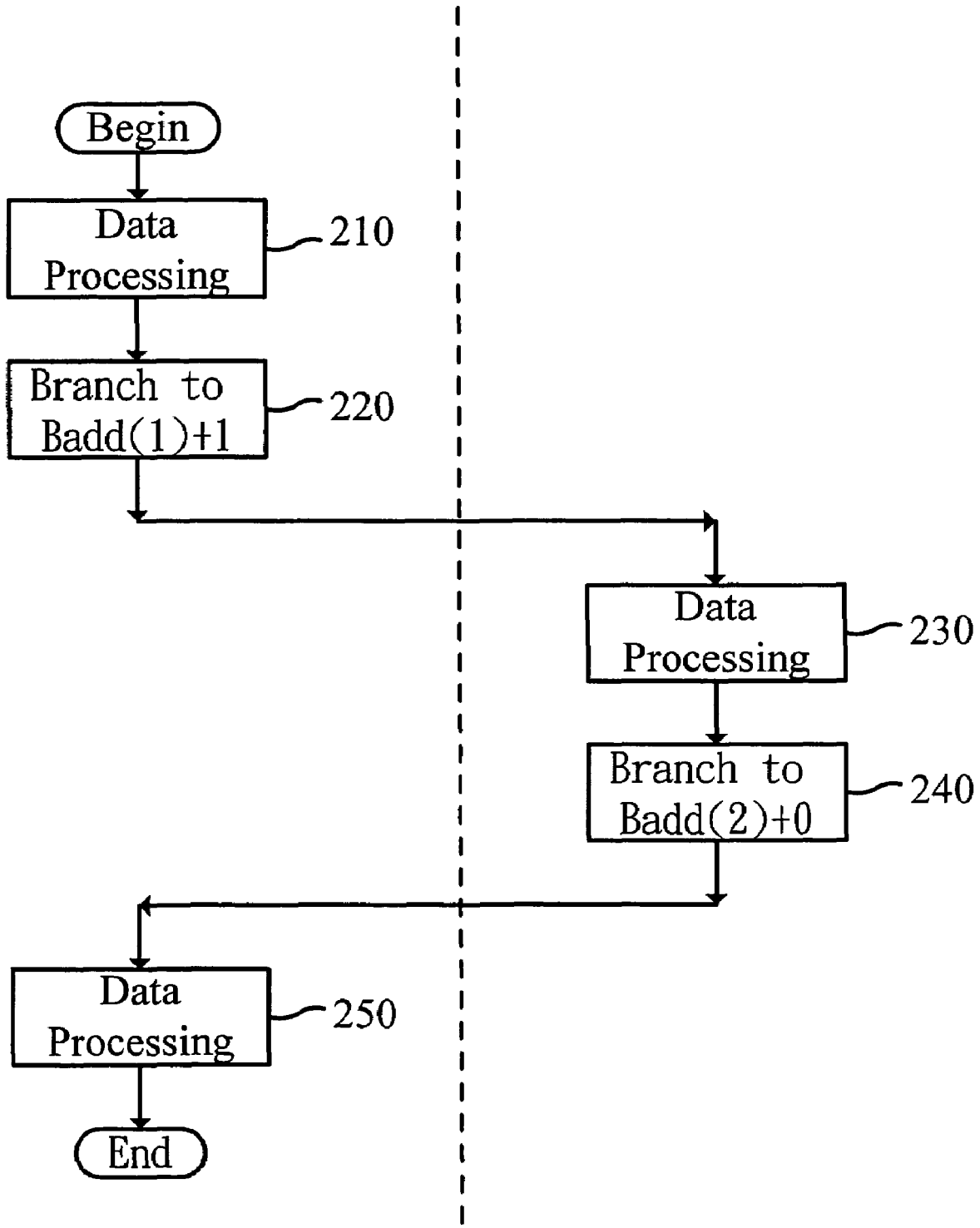
FIG. 1 is a schematic view of a typical instruction mode switching process.
Figure 2:
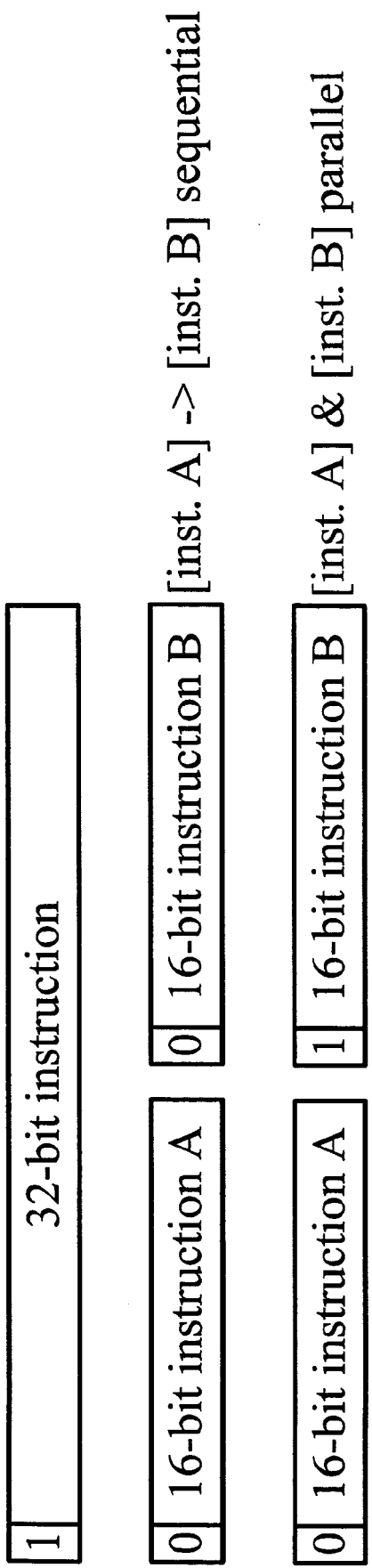
FIG. 2 is a schematic view of another typical instruction mode switching process.
Figure 3:
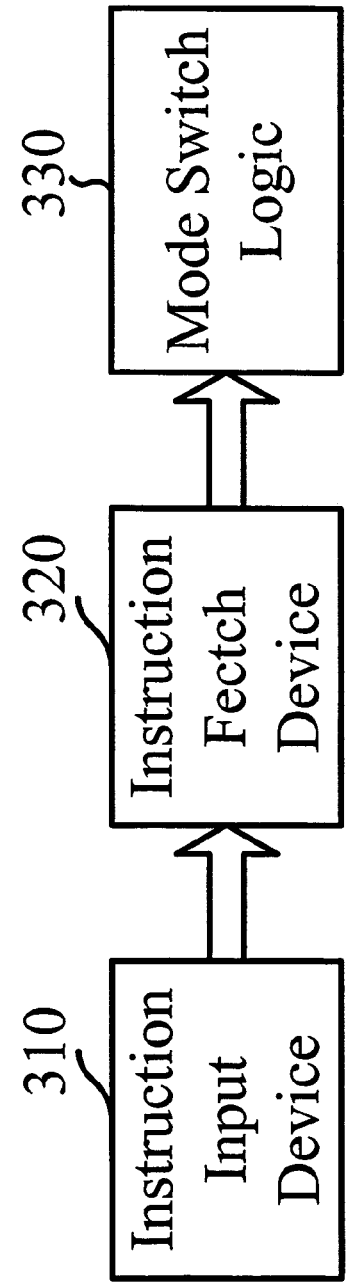
FIG. 3 shows an architecture of a processor using parity check to switch instruction modes in accordance with the invention.

FIG. 3 shows a system architecture of a processor using parity check to switch instruction modes in accordance with the invention. As shown, the processor includes an instruction input device 310, an instruction fetch device 320 and a mode switch logic 330. The instruction input device 310 includes a memory having a width of 2N=32 bits for storing a plurality of 2N-bit words representing instructions. The instruction fetch device 320 fetches a 2N-bit word from the instruction input device 310. The mode switch logic 330 determines whether the 2N-bit word fetched by the instruction fetch device 320 is two instructions of (N-P)=15 bits or one instruction of 2(N-P)=30 bits, to accordingly switches the processor into 16-bit or 32-bit mode.

In this embodiment, the processor can execute in the 16-bit (N) and 32-bit (2N) modes. In encoding the instruction set for the processor, the 16-bit mode instruction consists of a 16-bit word, and each 16-bit mode instruction includes a one-bit parity. The parity is preferably positioned on the most significant bit (MSB), but can be positioned on any bit. The 32-bit mode instruction consists of two 16-bit words, each having 1-bit parity and 15-bit instruction code. The parity is positioned on each 16-bit word's MSB.

Figure 4:
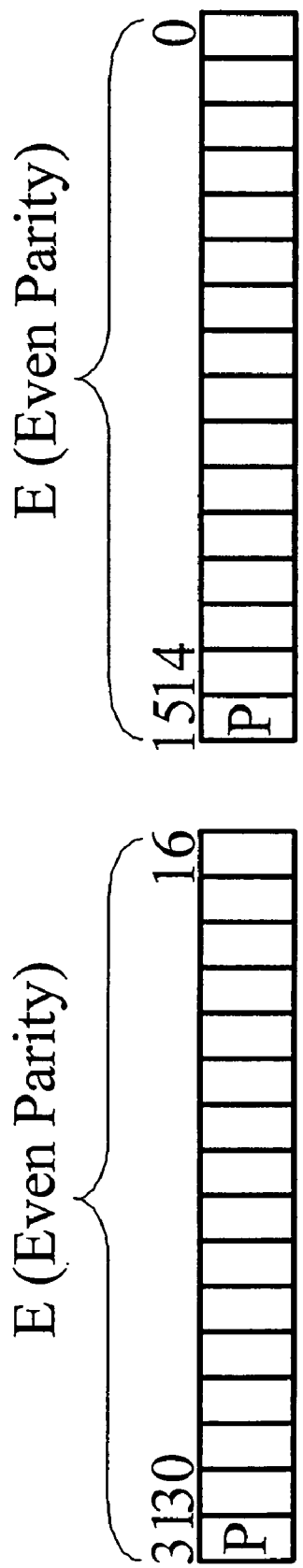
FIG. 4 is a schematic view of a parity generation while program is assembled in accordance with the invention.
Figure 4:
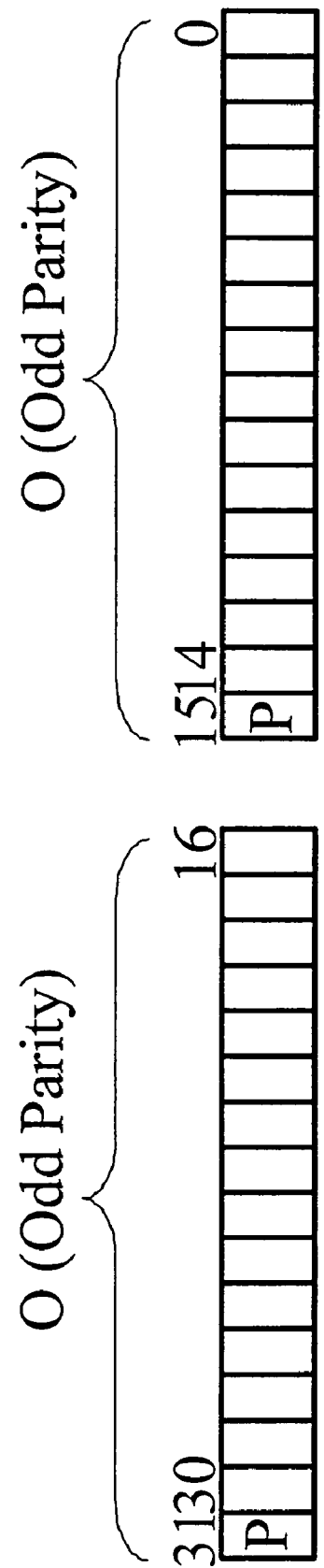

As shown in FIG. 4, it is assumed that the specific parity state of 32-bit word representing instruction is even parity. When the 32-bit word has two 16-bit instructions, the 31-st bit of the 32-bit word is the parity of one 16-bit mode instruction. The content of the parity is a logic value resulting in XOR operation to corresponding 15 bits of the 32-bit word, i.e., a 16-bit word from 30-th bit to 16-th bit in the 32-bit word, so that the bits from 31-st bit to 16-th bit provide an even parity. In addition, the 15-th bit of the 32-bit word is the parity of another 16-bit mode instruction. The content of the parity is a logic value resulting in the XOR operation to corresponding 15 bits of the 32-bit word, i.e., another 16-bit word from 14-th bit to 0-th bit in the 32-bit word, so that the bits from 15-th bit to 0-th bit also provide an even parity. Accordingly, two 16-bit words are set to a first parity state (even parity state) respectively.

Each 32-bit mode instruction has two parity bits. Namely, when a 30-bit instruction is included in the 32-bit word, the 31-st bit is a logic value resulting in the XNOR operation to corresponding 15 bits of the 32-bit word, i.e., from 30-th bit to 16-th bit in the 32-bit word, so that the bits from 31-st bit to 16-th bit provide an odd parity. In addition, the 15-th bit is a logic value resulting in the XNOR operation to corresponding 15 bits of the 32-bit word, i.e., from 14-th bit to 0-th bit in the 32-bit word, so that the bits from 15-th bit to 0-th bit also provide an odd parity. Accordingly, in each 32-bit mode instruction, each 16-bit word is set by corresponding parity to a second parity state (odd parity state).

After a program is assembled by an assembler, it indicates that a plurality of machine codes for the program are stored in a memory with 32-bit width of the instruction input device 310 for being executed by the processor. The instruction fetch device 320 fetches a 32-bit word from the instruction input device 310. The mode switch logic 330 determines whether the fetched 32-bit word is two 15-bit instructions or one 30-bit instruction, thereby switching the processor to corresponding 16-bit or 32-bit mode.

Figure 5:
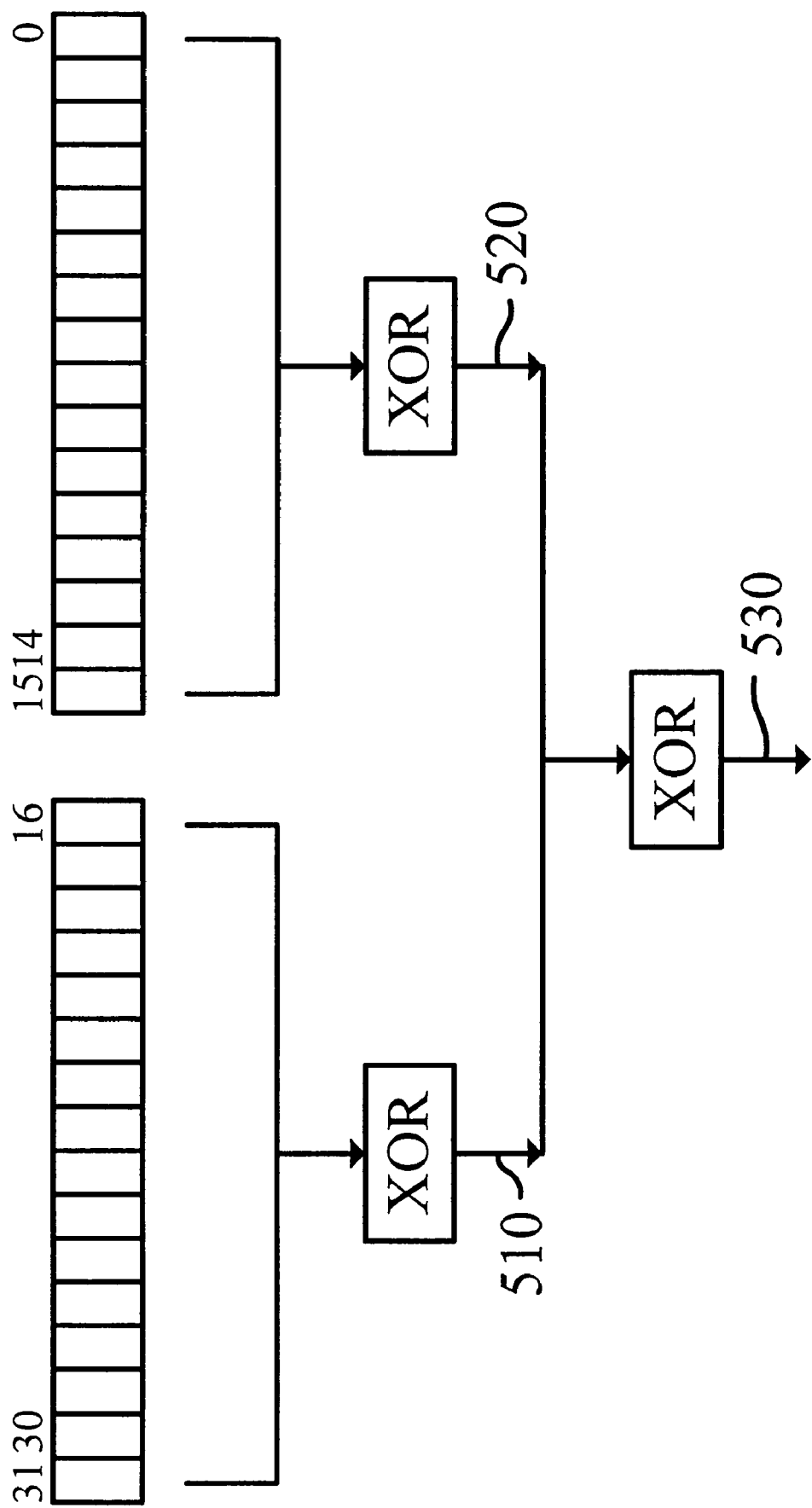
FIG. 5 is a schematic view of a parity check while program is executed in accordance with the invention.

The mode switch logic 330 firstly performs, as shown in FIG. 5, an XOR operation to the 31-st to 16-th bits of the 32-bit word fetched in order to obtain a UHP (upper half parity) signal 510, and an XOR operation to 15-th to 0-th bits of the 32-bit word fetched in order to obtain an LHP (lower half parity) signal 520. Next, the mode switch logic 330 performs an XOR operation to the signals 510 and 520 in order to obtain a WP (word parity) signal 530. Finally, according to the signals 510, 520 and 530, the mode switch logic 330 determines whether the processor is executed in the 16-bit or 32-bit mode.

As shown in FIG. 6, when the WP signal 530 is even parity E, it indicates that the 32-bit word includes at least one valid instruction. When the signals 510 and 520 are even parity E, it indicates that the 32-bit word fetched has two 15-bit instructions. When the signals 510 and 520 are odd parity O, it indicates that the 32-bit word fetched has one 30-bit instruction.

When the WP signal 530 is odd parity O, it indicates that the 32-bit word fetched does not include normal instruction but is on a special state. The special state may be as follows: (1) the 32-bit word fetched is located on a non-code block; (2) the 32-bit word fetched is located on a code block but error bit occurs and causes the switch from valid even parity E to odd parity O; (3) other special state transitions happen. In this embodiment, the WP signal 530 with odd parity O is defined as error bit existence, such that error data bit can be checked.

Figure 7:
FIG. 7 is a schematic view of memory disposition and six jump address states for a program in accordance with the invention.

FIG. 7 shows a view of memory disposition for machine codes generated after a program is assembled by the invention. In FIG. 7, some instruction formats require executing 15-bit instruction, whereas other instruction formats require executing 30-bit instruction. Therefore, a sequence of codes mixed with 30-bit and 15-bit instructions are generated. As shown in FIG. 7, according to the invention, a mixture of 32-bit and 16-bit mode instructions can be stored in the same block, thereby increasing code density.

In accordance with the invention, the processor can determine a proper instruction mode without assigning an instruction state for a jump address destination. That is, with to the mode switch logic 330, the processor can automatically determine a proper instruction mode based on the data content of a jump address. FIG. 7 also shows six different jump address states in the processor and proper instruction modes determined by the mode switch logic 330. These states are respectively described as follows:

State (1): when the processor jumps to a 32-bit boundary, WP=E indicates valid instruction and (UHP, LHP)=(O, O) indicates a 30-bit instruction; accordingly, the processor performs the 30-bit instruction.

State (2): when the processor jumps to a 32-bit boundary, WP=E indicates valid instruction and (UHP, LHP)=(E, E) indicates two 15-bit instructions; accordingly, the processor performs the first 15-bit instruction.

State (3): when the processor does not jump to a 32-bit boundary, WP=E indicates valid instruction and (UHP, LHP)=(E, E) indicates two 15-bit instructions; accordingly, the processor performs the second 15-bit instruction.

State (4): when the processor does not jump to a 32-bit boundary, WP=E indicates valid instruction and (UHP, LHP)=(O, O) indicates a 30-bit instruction; accordingly, the processor outputs an exception signal because error occurs.

State (5): when the processor jumps to a 32-bit boundary, WP=O indicates invalid instruction and is a special state; accordingly, the processor outputs the exception signal.

State (6): when the processor does not jump to a 32-bit boundary, WP=O indicates invalid instruction and is a special state; accordingly, the processor outputs the exception signal.

Figure 8:
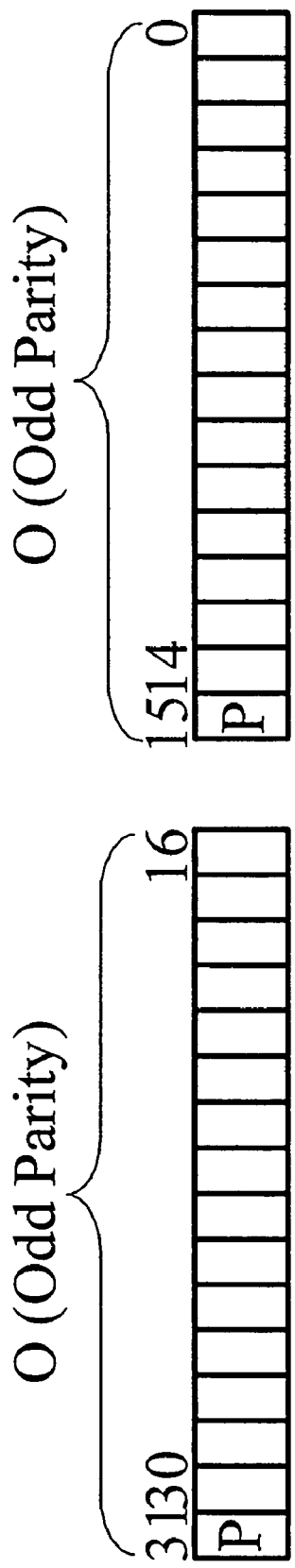
FIG. 8 is a schematic view of another parity generation while program is assembled in accordance with the invention.
Figure 8:
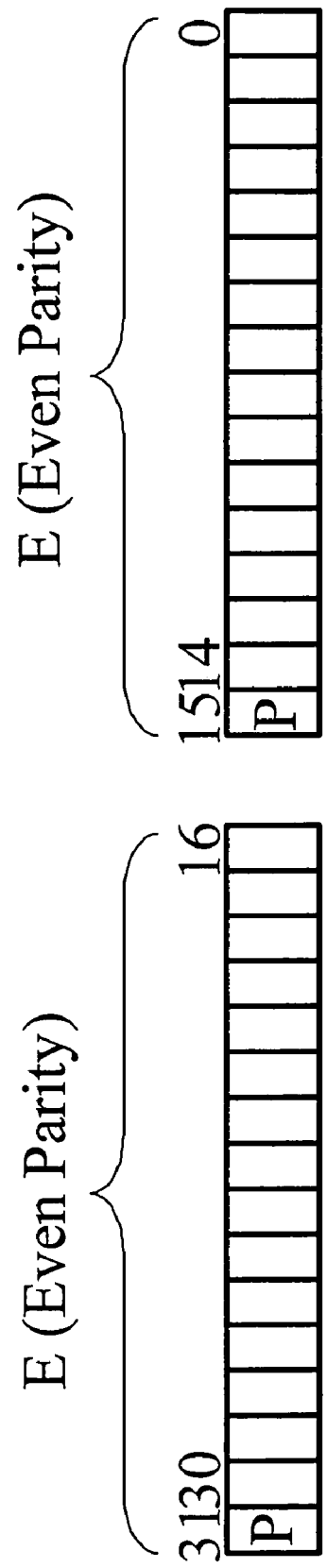

As shown in FIG. 8, the first parity state can be an odd parity state, and the second parity state can be an even parity state. Accordingly, when two 16-bit instructions are included in a 32-bit word, the 31-st bit is a logic value resulting in the XNOR operation to corresponding 15 bits of the 32-bit word, i.e., a 16-bit word from 30-th bit to 16-th bit in the 32-bit word, so that the bits from 31-st bit to 16-th bit provide an odd parity state. In addition, the 15-th bit is a logic value resulting in the XNOR operation to corresponding 15 bits of the 32-bit word, i.e., another 16-bit word from 14-th bit to 0-th bit in the 32-bit word, so that the bits from 15-th bit to 0-th bit also provide an odd parity state. Accordingly, two 16-bit words are set to a first parity state (odd parity state) respectively.

Each 32-bit mode instruction has two parity bits. Namely, when a 30-bit instruction is included in the 32-bit word, the 31-st bit is a logic value resulting in XOR operation to corresponding 15 bits of the 32-bit word, i.e., from 30-th bit to 16-th bit in the 32-bit word, so that the bits from 31-st bit to 16-th bit provide an even parity state. In addition, the 15-th bit is a logic value resulting in the XOR operation to corresponding 15 bits of the 32-bit word, i.e., from 14-th bit to 0-th bit in the 32-bit word, so that the bits from 15-th bit to 0-th bit also provide an even parity state. Accordingly, in each 32-bit mode instruction, each 16-bit word is set by corresponding parity to a second parity state (even parity state).

In another embodiment, it is assumed that the specific parity state of a 32-bit word representing instruction is odd parity, namely, WP=O (odd parity). At this point, in the 32-bit word, the parity check signal UHP of bits from 31-st bit to 16-th bit is opposite to the parity check signal LHP of bits from 15-th bit to 0-th bit because normal instruction is odd parity. In a normal instruction, the UHP is on a first parity state while the LHP is on a second parity state. That is, for a normal instruction (WP=O), when the first parity state is set as even parity E, i.e., UHP=E, it indicates that the 32-bit word includes two 15-bit instructions. In addition, for a normal instruction (WP=O), when the first parity state is set as odd parity O, i.e., UHP=O, it indicates that the 32-bit word includes a 30-bit instruction. As such, a corresponding parity look-up table is shown in FIG. 9.

FIG. 10 shows another parity look-up table. As shown, for a normal instruction (WP=O), when the first parity state is odd parity O, i.e., UHP=O, it indicates that the 32-bit word includes two 15-bit instructions. In addition, for a normal instruction (WP=O), when UHP=E, it indicates that the 32-bit word includes a 30-bit instruction.

In view of the foregoing, it is known that the inventive processor does not cause a halt due to jumping to the last half portion of a 32-bit instruction when executing branch or jump instruction. In case of jumping to the last half portion, an exception signal is sent as described in State (4). Therefore, jump address is not limited to a word boundary or 32-bit boundary. Similarly, the return addresses for branch-and-link and jump-and-link instructions are also not limited to the word boundary and 32-bit boundary. This increases not only code density but also convenience in use. In addition, the processor outputs the exception signal when it jumps to a wrong position on performing branch or jump instruction or it generates a wrong jump address due to hardware problem or external interference, for being processed by the operating system so as to prevent the entire system from halt or producing unpredictable errors. Thus, the system stability is increased and error tolerance is achieved.

Although the present invention has been explained in relation to its preferred embodiment, it is to be understood that many other possible modifications and variations can be made without departing from the spirit and scope of the invention as hereinafter claimed.

What is claimed is:

1. A processor using parity check to switch instruction modes, capable of executing N-bit and 2N-bit mode instructions respectively in N-bit and 2N-bit modes, an N-bit mode instruction consisting of an N-bit word, a 2N-bit mode instruction consisting of two N-bit words, each N-bit word including P-bit parity and (N-P)-bit instruction code, P being an integer greater than or equal to 1, wherein the parity of each N-bit mode instruction is even parity such that corresponding N-bit word has an even number of one bits, and the parities of each N-bit word of each 2N-bit mode instruction are odd parities such that corresponding N-bit words have an odd number of one bits, the processor comprising:

an instruction input device, which includes a memory having a width of 2N-bit for storing a plurality of 2N-bit words representing instructions;

an instruction fetch device, which fetches a 2N-bit word from the instruction input device; and a mode switch logic, which determines whether the 2N-bit word fetched by the instruction fetch device is two (N-P)-bit instructions or one 2(N-P)-bit instruction, and accordingly switches the processor to be in corresponding N-bit or 2N-bit mode, wherein when the 2N-bit word fetched is on an even parity state, which is determined by first performing an XOR operation on two N-bit words included in the 2N-bit word to thereby obtain two results and then performing an XOR operation on the two results, the 2N-bit word is determined as two (N-P)-bit instructions if the two results indicate that the two N-bit words are on the even parity state, and determined as one 2(N-P)-bit instruction if the two results indicate that the two N-bit words are on the odd parity state.

2. The processor as claimed in claim 1, wherein N=16 and P=1.

3. A method using parity check to switch instruction modes in a processor, the processor being executable in N-bit and 2N-bit modes, the processor having an instruction set to provide N-bit; and 2N-bit mode instructions, an N-bit mode instruction consisting of an N-bit word and a 2N-bit mode instruction consisting of two N-bit words, each N-bit word including P-bit parity and (N-P)-bit instruction code, P being an integer greater than or equal to 1, wherein the parity of each N-bit mode instruction is even parity such that corresponding N-bit word has an even number of one bits and the parities of each N-bit word of each 2N-bit mode instruction are odd parities such that corresponding N-bit words have an odd number of one bits, the method comprising:

fetching a 2N-bit word representing instructions;

when the 2N-bit word is on an even parity state, which is determined by first performing an XOR operation on two N-bit words included in the 2N-bit word to thereby obtain two results and then performing an XOR operation on the two results, determining that the 2N-bit word is two (N-P)-bit instructions if the two results indicate that the two N-bit words are both on the even parity state, and accordingly switching the processor to the N-bit mode; and when the 2N-bit word is on an even parity state, determining that the 2N-bit word is one 2(N-P)-bit instruction if the two results indicate that the two N-bit words are both on the odd parity state, and accordingly switching the processor to the 2N-bit mode.

4. The method as claimed in claim 3, wherein N=16 and P=1.

5. A processor using parity check to switch instruction modes, which executes N-bit and 2N-bit mode instructions respectively in N-bit and 2N-bit modes, an N-bit mode instruction consisting of an N-bit word, a 2N-bit mode instruction consisting of upper and lower N-bit words, each N-bit word including P-bit parity and (N-P)-bit instruction code, P being an integer greater than or equal to 1, wherein the parity of each upper N-bit mode instruction is even parity such that corresponding N-bit word has an even number of one bits, the parity of each lower N-bit mode instruction is odd parity such that corresponding N-bit word has an odd number of one bits, and the parities of each 2N-bit mode instruction are odd parities, the processor comprising:

an instruction input device, which includes a memory having a width of 2N-bit for storing a plurality of 2N-bit words representing instructions;

an instruction fetch device, which fetches a 2N-bit word from the instruction input device; and a mode switch logic, which determines whether the 2N-bit word fetched by the instruction fetch device is two (N-P)-bit instructions or one 2(N-P)-bit instruction, and accordingly switches the processor to be in corresponding N-bit or 2N-bit mode, wherein when the 2N-bit word fetched is on an odd parity state, which is determined by first performing an XOR operation on two N-bit words included in the 2N-bit word to thereby obtain two results and then performing an XOR operation on the two results, the 2N-bit word is determined as two (N-P)-bit instructions if one result corresponding to the upper N-bit word indicates the even parity state and determined as one 2(N-P)-bit instruction if the other result corresponding to the upper N-bit word indicates the odd parity state.

6. The processor as claimed in claim 5, wherein N=16 and P=1.

7. A method using parity check to switch instruction modes in a processor, the processor executing N-bit and 2N-bit mode instructions respectively in N-bit and 2N-bit modes, an N-bit mode instruction consisting of an N-bit word, a 2N-bit mode instruction consisting of upper and lower N-bit words, each N-bit word including P-bit parity and (N-P)-bit instruction code, P being an integer greater than or equal to 1, wherein the parity of each upper N-bit mode instruction is even parity such that corresponding N-bit word has an even number of one bits, the parity of each lower half N-bit mode instruction is odd parity such that corresponding N-bit word has an odd number of one bits, and the parities of each 2N-bit mode instruction are odd parities such that corresponding 2N-bit word has an odd parity number of one bits, the method comprising:

fetching a 2N-bit word representing an instruction;

when the 2N-bit word is even parity, which is determined by first performing an XOR operation on two N-bit words included in the 2N-bit word to thereby obtain two results and then performing an XOR operation on the two results, determining that the 2N-bit word is two (N-P)-bit instructions if one result corresponding to the upper N-bit word indicates the even parity state, and accordingly switching the processor to the N-bit mode; and when the 2N-bit word is odd parity, determining that the 2N-bit word is one 2(N-P)-bit instruction if the upper N-bit word is on the odd parity state, and accordingly switching the processor to the 2N-bit mode.

8. The method as claimed in claim 7, wherein N=16 and P=1.

9. A processor using parity check to switch instruction modes, capable of executing N-bit and 2N-bit mode instructions respectively in N-bit and 2N-bit modes, the N-bit mode instruction consisting of an N-bit word, the 2N-bit mode instruction consisting of an upper N-bit word and a lower N-bit word, each N-bit word including P-bit parity and (N-P)-bit instruction code, P being an integer greater than or equal to 1, wherein the parity of each upper N-bit mode instruction is odd parity such that corresponding N-bit word has an odd number of one bits, the parity of each lower N-bit mode instruction is even parity such that corresponding N-bit word has an even number of one bits, and the parities of each 2N-bit mode instruction are odd parities, the processor comprising:

an instruction input device, which includes a memory having a width of 2N-bit for storing a plurality of 2N-bit words representing instructions;

an instruction fetch device, which fetches a 2N-bit word from the instruction input device; and a mode switch logic, which determines whether the 2N-bit word fetched by the instruction fetch device is two (N-P)-bit instructions or one 2(N-P)-bit instruction, and accordingly switches the processor to be in corresponding N-bit or 2N-bit mode;

wherein when the 2N-bit word fetched is odd parity, which is determined by first performing an XOR operation on two N-bit words included in the 2N-bit word to thereby obtain two results and then performing an XOR operation on the two results, the 2N-bit word is determined as two (N-P)-bit instructions if one result corresponding to the upper N-bit word indicates the odd parity state, and determined as one 2(N-P)-bit instruction if the upper N-bit word is on the even parity state.

10. The processor as claimed in claim 9, wherein N=16 and P=1.

11. A method using parity check to switch instruction modes in a processor, the processor executing N-bit and 2N-bit mode instructions respectively in N-bit and 2N-bit modes, the N-bit mode instruction consisting of a N-bit word, the 2N-bit mode instruction consisting of an upper N-bit word and a lower N-bit word, each N-bit word including P-bit parity and (N-P)-bit instruction code, P being an integer greater than or equal to 1, wherein the parity of each upper N-bit mode instruction is odd parity such that corresponding N-bit word has an odd number of one bits, the parity of each lower N-bit mode instruction is even parity such that corresponding N-bit word has an even number of one bits, and each 2N-bit mode instruction is odd parity, the method comprising:

fetching a 2N-bit word representing an instruction;

when the 2N-bit word is odd parity, which is determined by first performing an XOR operation on two N-bit words included in the 2N-bit word to thereby obtain two results and then performing an XOR operation on the two results, determining that the 2N-bit word is two (N-P)-bit instructions if one result corresponding to the upper N-bit word indicates the odd parity state, and accordingly switching the processor to the N-bit mode; and when the 2N-bit word is odd parity, determining that the 2N-bit word is one 2(N-P)-bit instruction if the upper N-bit word is on the even parity state, and accordingly switching the processor to the 2N-bit mode.

12. The method as claimed in claim 11, wherein N=16 and P=1.

* * * * *